(12) United States Patent
Van Den Berg

(10) Patent No.: US 10,051,833 B2
(45) Date of Patent: Aug. 21, 2018

(54) MILKING DEVICE AND METHOD OF CLEANING SAME

(75) Inventor: Karel Van Den Berg, Bleskengraaf (NL)

(73) Assignee: LELY PATENT N.V., Maassluis (NL)

( * ) Notice: Subject to any disclaimer, the term of this patent is extended or adjusted under 35 U.S.C. 154(b) by 0 days.

(21) Appl. No.: 13/487,222

(22) Filed: Jun. 3, 2012

(65) Prior Publication Data

US 2012/0234355 A1     Sep. 20, 2012

Related U.S. Application Data

(63) Continuation of application No. PCT/NL2010/000165, filed on Nov. 19, 2010.

(30) Foreign Application Priority Data

Dec. 2, 2009 (NL) ...................................... 1037523

(51) Int. Cl.
*A01J 7/02* (2006.01)

(52) U.S. Cl.
CPC .............. *A01J 7/025* (2013.01); *A01J 7/022* (2013.01)

(58) Field of Classification Search
CPC ..................................................... A01J 7/025
USPC ........ 119/14.01, 14.14, 14.18, 650, 665, 670
See application file for complete search history.

(56) References Cited

U.S. PATENT DOCUMENTS

| | | | |
|---|---|---|---|
| 4,175,514 A * | 11/1979 | Souza et al. ................ | 119/14.08 |
| 4,222,346 A * | 9/1980 | Reisgies .................... | 119/14.18 |
| 5,651,329 A * | 7/1997 | van den Berg .......... | A01J 5/007 |
| | | | 119/14.02 |
| 6,079,359 A * | 6/2000 | van den Berg ............ | 119/14.01 |
| 6,267,077 B1 * | 7/2001 | van den Berg et al. ... | 119/14.01 |
| 6,276,297 B1 * | 8/2001 | van den Berg et al. ... | 119/14.01 |
| 6,561,126 B2 * | 5/2003 | Forsen et al. .............. | 119/14.02 |
| 6,584,930 B2 * | 7/2003 | Buecker ..................... | 119/14.02 |
| 6,626,130 B1 * | 9/2003 | Eriksson ................. | A01J 7/025 |
| | | | 119/651 |
| 7,036,981 B2 * | 5/2006 | Veenstra et al. .............. | 374/142 |
| 7,263,948 B2 * | 9/2007 | Ericsson et al. ........... | 119/14.18 |

(Continued)

FOREIGN PATENT DOCUMENTS

DE    102006053602 A1    5/2008
EP        679331 A2        11/1995

(Continued)

OTHER PUBLICATIONS

International Search Report of PCT/NL2010/000165 dated Mar. 8, 2011.

*Primary Examiner* — David J Parsley
(74) *Attorney, Agent, or Firm* — Hoyng Rokh Monegier LLP; Ramin Amirsehhi

(57) ABSTRACT

The milking machine and method of cleaning the same comprises more than one teat cup with a teat cup liner and a discharge, a pulsator with a control device, and a cleaning device to clean the teat cup by supplying cleaning liquid in the teat cup, wherein the control device is configured to adjust per teat cup, during the cleaning, the flow of the cleaning liquid through the teat cup liner and the discharge by pulsation of the teat cup liner. The teat cup liner itself acts as a valve during the cleaning. This has the advantage that a separate cleaning valve in the milk line is not required, which results in a simpler and more reliable construction.

5 Claims, 1 Drawing Sheet

(56) References Cited

U.S. PATENT DOCUMENTS

| | | | |
|---|---|---|---|
| 7,536,975 B2 * | 5/2009 | Denes et al. ............... | 119/14.47 |
| 7,963,249 B2 * | 6/2011 | Duke ......................... | 119/14.47 |
| 2004/0244700 A1 * | 12/2004 | Schulze-Wartenhorst . | 119/14.47 |
| 2011/0155068 A1 | 6/2011 | Maier et al. | |

FOREIGN PATENT DOCUMENTS

| | | | |
|---|---|---|---|
| EP | 0682862 A2 | | 11/1995 |
| EP | 1579759 A1 | | 9/2005 |
| GB | 254521 A | | 7/1926 |
| JP | 4-3425 | * | 1/1992 |

* cited by examiner

MILKING DEVICE AND METHOD OF CLEANING SAME

CROSS REFERENCE TO RELATED APPLICATIONS

This application is a continuation of PCT application number PCT/NL2010/000165 filed on 19 Nov. 2010, which claims priority from Netherlands application number 1037523 filed on 2 Dec. 2009. Both applications are hereby incorporated by reference in their entireties.

BACKGROUND OF THE INVENTION

1. Field of the Invention

The present invention relates to a milking machine comprising more than one teat cup with a teat cup liner and a discharge, a pulsator with a control device, and a cleaning device to clean the teat cup by supplying cleaning liquid in the teat cup. The invention also relates to a method of cleaning the milking machine.

2. Description of the Related Art

Milking machines are known from for example European patent application 0679331A2. This device has inter alia a function to clean the teat cups and the milk line. The cleaning liquid is supplied in the teat cups via separate lines. These lines comprise a closing element to regulate the required amount of the cleaning liquid, which closing element is driven by the pulsator.

A disadvantage of such a system is that the construction of the cleaning circuit is unnecessarily complicated. Another disadvantage is that, because of superfluous elements in the cleaning circuit, the installation of said system requires additional costs and becomes less reliable.

A teat cup cleaning device is known from British patent 254521. The device has a function to clean the teat cups and the milk line. The cleaning liquid is supplied in the teat cups via a central, common line with a non-return valve. The pulsator increases the cleaning power by moving the liner.

BRIEF SUMMARY OF THE INVENTION

An object of the present invention is to at least partially overcome at least one of the above-mentioned drawbacks, or else to provide a usable alternative.

This object is achieved by a device wherein the control device is configured to adjust per teat cup, during the cleaning, the flow of the cleaning liquid through the teat cup liner and the discharge by changing the pulsation pattern of the teat cup liner.

The invention is further characterized in that during the cleaning the teat cup liner itself acts, under the control of the control device, as an individual control valve per teat cup. This has the advantage that a separate closing valve in the milk line is not required, which results in a simpler and more reliable construction. The pulsation pattern can, for example, be regulated or adjusted in frequency, suction-rest ratio, etcetera.

Another device is known from European application 0682861A2, which is hereby incorporated by reference in its entirety, in which the teat cup liner in the teat cup is closed during the cleaning. The cleaning liquid does not flow through the teat cup liner and further through the discharge, but flows from above to outside the teat cup. In the present invention, the cleaning liquid flows through the teat cup liner and the discharge, in which case the teat cup liner opens and closes by means of pulsation. As a result thereof, said flow through can be controlled, in particular changed, for example by regulating the duration of the closed position of the teat cup liner and/or the frequency. This construction has the advantage that both the teat cup liner and the discharge can be rinsed. In the present invention, the flow of the cleaning liquid is defined by changing the pulsation.

It should also be noted that EP0679331, which is hereby incorporated by reference in its entirety, does not disclose a pulsation during cleaning. A milking program for the pulsation cannot work as such, because the cleaning liquid, and the supply thereof, differs too much from milking, and a milk yield, respectively.

The milking machine according to the present invention comprises more than one teat cup and the control device is configured to set the pulsation pattern per quarter or per total udder. An advantage thereof is that an animal can be milked more quickly than in the case in which the milking machine comprises only one teat cup. It is further advantageous that the pulsation can be set per teat cup, so as to enable a better adjustment of the cleaning to each teat cup, because the teat cups can have mutually different degrees of contamination. However, it is also advantageous to set the pulsation for the total udder, i.e. uniformly for all teat cups, because in that case a simple setting of the control device, simpler equipment, respectively is required.

Another disadvantage of the device known from EP0679331A2 and GB254521 is that upon application of the cleaning liquid the resulting cleanliness cannot be determined. Both references are hereby incorporated by reference in their entireties. In particular, the present invention also aims at enabling the cleaning of the teat cup liner in dependence on the required and/or achieved cleanliness.

In an embodiment of the invention, the milking machine comprises for that purpose a sensor which is operatively coupled to the control device to issue a sensor signal on the basis of which the control device controls the pulsation. An advantage of this embodiment is that the cleaning can be more flexible and efficient by making the cleaning dependent on the sensor signal. The sensor can, for example, determine a quantity related to the cleaning.

In an embodiment of the invention, the sensor is configured to determine the cleanliness of the cleaning liquid flown through the teat cup liner and the discharge and to issue the sensor signal on the basis thereof. An advantage of this embodiment is that by determining the cleanliness of the cleaning liquid an efficient use thereof is achieved. This results in time-saving during the cleaning. Moreover, it makes it possible to prevent that the cleaning stops before the teat cup liner and discharge to be cleaned are sufficiently clean. The determination of the cleanliness of the cleaning liquid can be carried out in different manners: by means of determining the density, colour, mass or another parameter of the cleaning liquid. The determination of the cleanliness of the liquid can also prevent that the teat cup liner and the discharge come into contact with contaminated cleaning liquid, in which case the cleaning is no longer effective. In this manner, a fresh portion of cleaning liquid can be applied in time and the used amount of cleaning liquid can be discharged.

In an embodiment of the invention, the sensor is configured to determine, for at least one teat cup liner, the required flow of the cleaning liquid and to issue the sensor signal on the basis thereof. An advantage of the embodiment is that the teat cup liner and discharge to be cleaned can be cleaned, in dependence on their level of contamination, by regulating speed, amount and the like of the cleaning liquid by the pulsator on the basis of the sensor signal. The movement energy of the liquid is applied in particular to the cleaning.

In an embodiment of the invention, the control device is configured to determine the time of contact of the cleaning liquid with a conduit that should be cleaned. In this case, "conduit" relates to the whole of teat cup liner and discharge, through which the liquid flows. An advantage of this embodiment is that the cleaning liquid is used more efficiently when applying the method of determining the required flow. A longer time of contact results in a longer soaking time. This means that at least some kinds of contamination can resolve to a higher degree in the cleaning liquid. This can, for example, be achieved by keeping the teat cup liner closed for a longer period of time or by decreasing the frequency of opening and closing.

In an embodiment of the invention, the control device is configured to regulate the flow of the cleaning liquid by adjusting the frequency of the pulsation pattern. An advantage of this embodiment is that this construction does not require additional devices to make the cleaning liquid flow. This function is carried out by the teat cup liner itself. By adjusting the frequency, the amount, speed and other parameters can be controlled in a simple manner, so that a simple supply mechanism will suffice.

In an embodiment of the invention, the control device is configured to regulate the flow of the cleaning liquid by adjusting the duration of the closed position of the teat cup liner, and the frequency, if desired. Here, the duration of the open position is, for example but not necessarily, equally long in each case, so that the portions of cleaning liquid are approximately equally large in each case. An advantage of this embodiment is that, per amount of cleaning liquid, a soaking or action time, such as a disinfection time, can be set.

In an embodiment of the invention, the control device is configured to regulate the flow of the cleaning liquid by adjusting the duration of the open phase of pulsation. As a result thereof, the supply amount can be regulated efficiently. An advantage of this embodiment is that the flowing through of the cleaning liquid can be combined with the soaking of the dirt in the teat cup liner and the discharge.

The invention also relates to a method of cleaning a milking machine characterized in that the flow of the cleaning liquid through the teat cup liner and the discharge is regulated per teat cup by changing the pulsation pattern during the flow of the cleaning liquid. Here, substantially the same advantages as described for the associated milking machine are applicable.

The milking machine comprises more than one teat cup and the control device sets the pulsation pattern per teat cup. In particular, with the aid of a sensor coupled to the control device, a parameter is measured and converted into a signal, with the aid of which the control device adjusts the pulsation pattern. Advantageously, the sensor measures the cleanliness of the cleaning liquid flown through the teat cup liner and the discharge in the form of a signal on the basis of which the control device adjusts the pulsation pattern.

BRIEF DESCRIPTION OF THE DRAWINGS

The features and advantages of the invention will be appreciated upon reference to the following drawings, in which:

FIG. 2a shows in a schematic cross-sectional front view a teat cup according to the invention with teat cup liner and rinsing jetter before the cleaning liquid is supplied;

FIG. 2b shows in a schematic cross-sectional front view a teat cup with teat cup liner and rinsing jetter according to the invention at the moment when the cleaning liquid is applied; and FIG. 2c shows in a schematic cross-sectional front view a teat cup with teat cup liner and rinsing jetter according to the invention after the teat cup liner has occupied the open position and the cleaning liquid flows on.

DESCRIPTION OF ILLUSTRATIVE EMBODIMENTS

Figure 1:
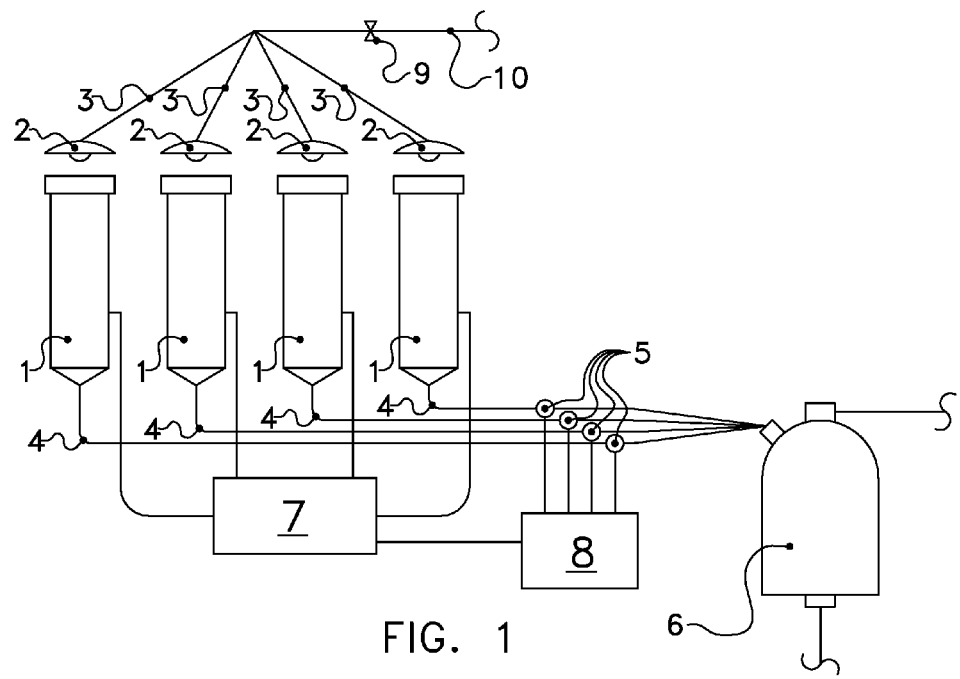
FIG. 1 shows in a schematic view a system of four teat cups according to the invention.

The following is a description of certain embodiments of the invention, given by way of example only and with reference to the drawings. FIG. 1 shows an embodiment of the invention with four teat cups 1 according to the present invention. The features of the inventive method will be set out clearly in the description with respect to the device.

FIG. 1 shows in a schematic view an embodiment of the invention with four teat cups 1. The milking machine comprises a line 10 through which a cleaning liquid is supplied, an optional valve 9 to close the line, supply lines 3 through which the cleaning liquid is supplied in the rinsing jetters 2 to clean the teat cups 1. The milking machine comprises discharge lines 4 through which the cleaning liquid flows on to a milk glass 6, the lines 4 comprising sensors 5 which are coupled to a control device 8.

A cleaning liquid is supplied, via line 10 and subsequently via supply lines 3, in the teat cups 1 with the aid of rinsing jetters 2. By means of an optional valve 9, the supply of the cleaning liquid can be closed for all supply lines. At the same time, via pulsator 7 a vacuum is created in the pulsation spaces in the teat cups, so that the teat cup liners assume a closed position. As a result thereof, a certain amount of cleaning liquid is applied in the teat cup liner. After some soaking during the closed-time of the pulsator, if desired, the teat cup liner reopens, so that the liquid can be replaced by fresh liquid. In this case, the used cleaning liquid is discharged via the discharge, and the teat cup liner and the discharge are rinsed. The sensors 5 which are coupled to the control device 8 of the pulsator 7 determine whether the desired cleanliness of the teat cup liner and the discharge has been achieved. These sensors can, for example, determine colour, conductivity or another parameter of the cleaning liquid and send a signal to the control device 8 of the pulsator 7 about whether the cleaning has been completed. In this manner, the cleaning liquid is used efficiently in dependence on the required cleanliness of the teat cup liner and the discharge. If desired, the flow can be adjusted by adjusting the frequency of pulsation of the teat cup liner, duration of the open and/or closed position of the teat cup liner, time of contact of the cleaning liquid with the surface to be cleaned. If desired, the cleanliness can also be achieved by soaking the cleaning liquid in the space between the upper lip of the teat cup liner and the part of the teat cup liner where the latter is closed. In dependence on the contamination and the cleaning agent used, it is possible to decide between soaking or flow rinsing, or a combination thereof.

Figure 2:
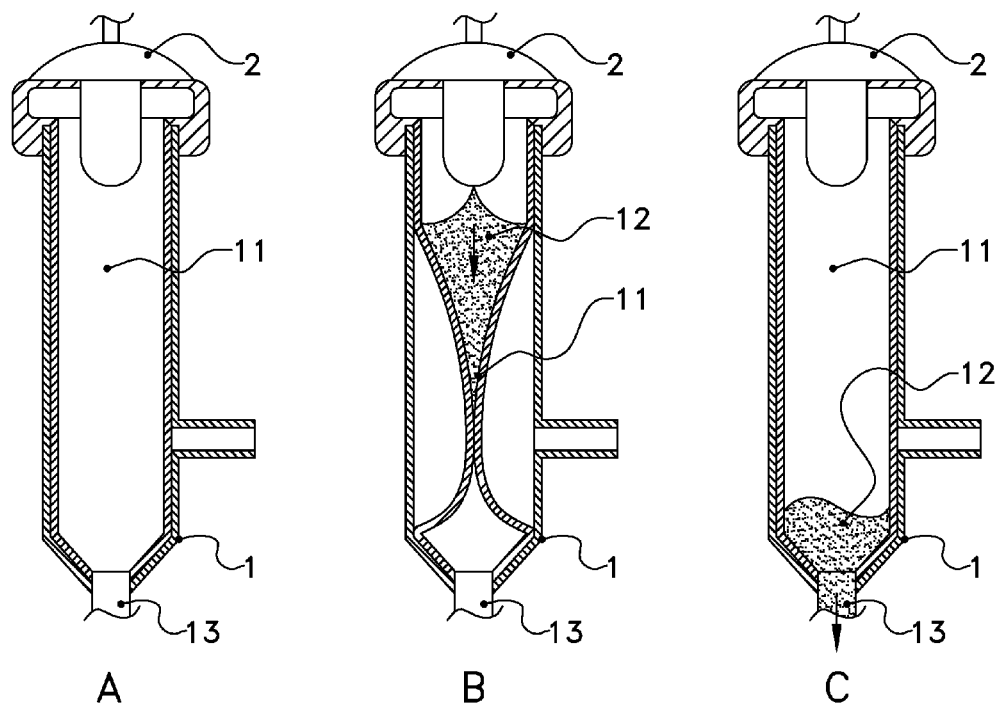

FIG. 2a shows in a schematic cross-sectional front view a teat cup with teat cup liner and rinsing jetter according to the invention before the cleaning liquid is applied. At this moment, teat cup liner 11 is in open position and the rinsing jetter 2 is located on the upper part of the teat cup liner.

Rinsing liquid can now be injected and washed through immediately, but for an efficient application the situation of FIG. 2b can be awaited.

FIG. 2b shows in a schematic cross-sectional front view a teat cup with teat cup liner and rinsing jetter according to the invention at the moment when the cleaning liquid is applied. Through the pressure difference which is generated in the pulsation space by the pulsator the teat cup liner 11 assumes a closed position. At the same time the cleaning liquid 12 flows, via rinsing jetter 2, into the teat cup liner 11. In dependence on the required soaking time and/or cleanliness, the teat cup liner remains closed during a certain period of time. Also if the liquid has, for example, a disinfecting action, a certain action time can be desirable.

FIG. 2c shows in a schematic cross-sectional front view a teat cup with teat cup liner and rinsing jetter according to the invention after the teat cup liner has assumed the open position and the cleaning liquid flows on. As soon as the teat cup liner 11 is reopened, the cleaning liquid 12 flows on via discharge 13, as a result of which the discharge is also cleaned. It will only be possible to complete the cleaning of the discharge when the cleaning of the teat cup is in a sufficiently advanced stage and the liquid which flows away is sufficiently clean.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A milking machine comprising more than one teat cup, wherein the teat cup comprises a teat cup liner and a discharge, and wherein the milking machine comprises a pulsator with a control device, and a cleaning device for cleaning the teat cup by supplying cleaning liquid in the teat cup,
   wherein the milking machine comprises a sensor which is configured to determine, for at least one teat cup liner, the required flow of the cleaning liquid and to issue a sensor signal on the basis thereof, and which is operatively coupled to the control device to issue said sensor signal on the basis of which the control device controls the pulsation pattern,
   wherein the pulsator with the control device is configured to adjust individually per teat cup a pulsation ratio of the teat cup liner while the cleaning liquid is being supplied in the teat cup,
   wherein the control device is configured to adjust the duration of the open phase of pulsation.

2. The milking machine according to claim 1, wherein the sensor is configured to determine the cleanliness of the cleaning liquid flown through the teat cup liner and the discharge and to issue the sensor signal on the basis thereof.

3. The milking machine according to claim 1, wherein the control device is configured to determine the time of contact of the cleaning liquid with a conduit to be cleaned.

4. A method of cleaning a milking machine comprising at least one teat cup with a teat cup liner and a discharge, a pulsator with a control device, and a cleaning device to clean the teat cup by supplying cleaning liquid in the teat cup, wherein said method comprising:
   supplying the cleaning liquid, through a line and subsequently through supply lines in the teat cup liner by rinsing jetters,
   determining for at least one teat cup liner the required flow of the cleaning liquid via a sensor, which is operatively coupled to the control device,
   adjusting individually per teat cup duration of open phase of pulsation and the pulsation pattern via the control device, wherein the control device generates a sensor signal on the basis of the determined required flow of the cleaning liquid to control the open phase and the pulsation pattern, and
   adjusting individually per teat cup a pulsation ratio of the teat cup liner while the cleaning liquid is being supplied in the teat cup via the rinsing jetters.

5. The method according to claim 4, wherein the sensor measures the cleanliness of the cleaning liquid flown through the teat cup liner and the discharge by a signal by which the control device regulates the pulsation pattern.

* * * * *